(12) United States Patent
Yang et al.

(10) Patent No.: US 11,880,931 B2
(45) Date of Patent: *Jan. 23, 2024

(54) HIGH-DEFINITION CITY MAPPING

(71) Applicant: Pony AI Inc., Grand Cayman (KY)

(72) Inventors: Mengda Yang, Sunnyvale, CA (US); Weixin Jiang, Guangzhou (CN); Chuanchuan Liu, Wuhan (CN)

(73) Assignee: Pony AI Inc., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,729

(22) Filed: Feb. 14, 2023

(65) Prior Publication Data

US 2023/0186549 A1 Jun. 15, 2023

Related U.S. Application Data

(63) Continuation of application No. 17/588,679, filed on Jan. 31, 2022, now Pat. No. 11,580,688, which is a (Continued)

(51) Int. Cl.
*G06T 15/08* (2011.01)
*G06T 7/70* (2017.01)
*G01S 17/89* (2020.01)
*G06T 1/20* (2006.01)
*G06F 18/25* (2023.01)

(52) U.S. Cl.
CPC .............. *G06T 15/08* (2013.01); *G01S 17/89* (2013.01); *G06F 18/25* (2023.01); *G06T 1/20* (2013.01); *G06T 7/70* (2017.01); *G06T 2207/10028* (2013.01)

(58) Field of Classification Search
CPC ........... G01S 2013/93272; G01S 17/86; G01S 2013/93271; G01S 2013/93274; G01S 13/865; G01S 17/89; G01C 21/3841; G06F 18/25; G06T 7/70; G06T 15/08; G06T 1/20; G06T 2207/10028; G06T 2210/56;
(Continued)

(56) References Cited

U.S. PATENT DOCUMENTS 10,579,875 B2  3/2020  Dal Mutto et al.
11,238,643 B1  2/2022  Yang et al.
(Continued)

OTHER PUBLICATIONS

He et al., "An Iterative Closest Points Algorithm for Registration of 3D Laser Scanner Point Clouds with Geometric Features", Sensors(Basel). 2017;17(8):1862. Published Aug. 11, 2017. doi: 10.3390/s17081862.

*Primary Examiner* — Phi Hoang

(57) ABSTRACT

A vehicle generates a city-scale map. The vehicle includes one or more Lidar sensors configured to obtain point clouds at different positions, orientations, and times, one or more processors, and a memory storing instructions that, when executed by the one or more processors, cause the system to perform registering, in pairs, a subset of the point clouds based on respective surface normals of each of the point clouds; determining loop closures based on the registered subset of point clouds; determining a position and an orientation of each of the subset of the point clouds based on constraints associated with the determined loop closures; and generating a map based on the determined position and the orientation of each of the subset of the point clouds.

20 Claims, 11 Drawing Sheets

Related U.S. Application Data continuation of application No. 17/124,444, filed on Dec. 16, 2020, now Pat. No. 11,238,643.

(58) Field of Classification Search
CPC ........... G06T 17/00; G06T 2207/10016; G06T 2207/30252; G06T 7/33; G06V 20/56
See application file for complete search history.

(56) References Cited

U.S. PATENT DOCUMENTS

| | | |
|---|---|---|
| 2019/0319851 A1 | 10/2019 | Eckart |
| 2020/0217666 A1 | 7/2020 | Zhang |
| 2020/0284590 A1* | 9/2020 | Chen ................. G01C 21/3841 |
| 2020/0309529 A1 | 10/2020 | Ambert |
| 2020/0404243 A1 | 12/2020 | Saphier |
| 2021/0004017 A1 | 1/2021 | Colgate |
| 2021/0072404 A1* | 3/2021 | Cai ........................ G01S 19/23 |
| 2021/0073571 A1 | 3/2021 | Bergen |
| 2021/0158547 A1 | 5/2021 | He |
| 2021/0286923 A1* | 9/2021 | Kristensen .............. G01S 7/412 |

* cited by examiner

HIGH-DEFINITION CITY MAPPING

CROSS REFERENCE TO RELATED APPLICATIONS

This application is a continuation of U.S. Ser. No. 17/588,679, filed Jan. 31, 2022, which is a continuation of U.S. Ser. No. 17/124,444, filed Dec. 16, 2020, now U.S. Pat. No. 11,238,643 B1, the content of which is hereby incorporated by reference in its entirety.

BACKGROUND

High accuracy mapping on a scale of a city may be infeasible using global position satellite (GPS), or global navigation satellite system (GNSS) navigation alone due to outages and limits in accuracy. GPS receivers require a continuous, clear line of sight to multiple satellites in the sky. However, in an environment of a city, signals from the GPS receivers may be degraded and discontinuous because dense urban features such as buildings, tunnels, and underground structures obstruct the line of sight to the satellites. In order to address the shortcomings of GPS, during the past two decades, simultaneous localization and mapping (SLAM) has been a growing topic in an effort to both build a map of an environment surrounding a robot and localize the robot within the map.

SUMMARY

Described herein, in some embodiments, is a vehicle configured to generate a city-scale map, the vehicle comprising one or more Lidar sensors configured to obtain point clouds at different positions, orientations, and times; one or more processors; and a memory storing instructions that, when executed by the one or more processors, cause the system to perform: registering, in pairs, a subset of the point clouds based on respective surface normals of each of the point clouds; determining loop closures based on the registered subset of point clouds; determining a position and an orientation of each of the subset of the point clouds based on constraints associated with the determined loop closures; and generating a map based on the determined position and the orientation of each of the subset of the point clouds.

In some embodiments, the registering comprises: aligning a target point cloud with a source point cloud; and determining a rigid transformation including a rotation and a translation to form a closest alignment, out of all possible alignments, between the target point cloud and the source point cloud, wherein the target point cloud was obtained at a later time compared to the source point cloud.

In some embodiments, the aligning the target point cloud with a source point cloud comprises: selecting, using a graphics processing unit (GPU), for a point from the source point cloud, a corresponding closest point in the target point cloud; determining whether the point and the corresponding closest point have a same category; in response to determining that the point and the corresponding closest point have a same category, determine a mahalanobis distance between the point and the corresponding closest point; and determine a position parameter and an orientation parameter of the source point cloud and the target point cloud based on the determined mahalanobis distance.

In some embodiments, the aligning the target point cloud with a source point cloud further comprises: iteratively selecting additional points from the source point cloud and respective closest points in the target point cloud until an updated position parameter and an updated orientation parameter converge; determining whether each pair comprising an additional point of the additional points and a respective closest point of the respective closest points have a same category; for each pair having a same category: determining a mahalanobis distance between additional point and the respective closest point; and determine the updated position parameter and the updated orientation parameter of the source point cloud and the target point cloud based on the determined mahalanobis distances between the additional point and the respective closest point, and between the point and the corresponding closest point; determining whether a difference between the updated position parameter and an immediate previous position parameter is less than a threshold, and whether a second difference between the updated orientation parameter and an immediate previous orientation parameter is less than a threshold; and in response to determining that the difference is less than a threshold and the second difference is less than the second threshold, determining that the updated position parameter and the updated orientation parameter converge.

In some embodiments, the vehicle further comprises an IMU and a GNSS sensor, and wherein the instructions further cause the system to perform: fusing GNSS data and IMU data using GNSS/INS post processing to estimate odometry data of the vehicle, the odometry data including a position, an orientation, and a velocity of the vehicle; and determining a position and an orientation of each of the subset of the point clouds based on a constraint associated with the fused GNSS/IMU data and based on a constraint associated with the determined loop closures.

In some embodiments, the determining a position and an orientation of each of the subset of the point clouds is based on a distance between the vehicle and each of the subset of the point clouds.

In some embodiments, the constraint associated with the fused GNSS/IMU data requires that the vehicle be within a range of distances at two distinct times.

In some embodiments, the instructions further cause the system to perform: constructing cost functions corresponding to each of the constraint associated with the determined loop closures and the constraint associated with the fused GNSS/IMU data; and the determining a position and an orientation of each of the subset of the point clouds is based on an optimization of the cost functions corresponding to each of the constraint associated with the determined loop closures and the constraint associated with the fused GNSS/IMU data.

In some embodiments, the instructions further cause the system to perform: determining whether the constraint associated with the determined loop closures and the constraint associated with the fused GNSS/IMU data is satisfiable; and in response to determining that the constraint associated with the determined loop closures or the constraint associated with the fused GNSS/IMU data is unsatisfiable, removing the constraint determined to be unsatisfiable based on a self-adaption threshold of an actual cost, iterations of repetition, and differences in Euclidean distance.

In some embodiments, the instructions further cause the system to perform: adding an additional constraint associated with a loop closure corresponding to a region where a frequency or concentration of repeating features exceeds a threshold frequency or density.

Various embodiments of the present disclosure provide a method implemented by a computing system as described above.

These and other features of the apparatuses, systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 2A illustrates an example of generating a pose graph.

FIG. 2B illustrates an example of a loop closure detection.

DETAILED DESCRIPTION

The genesis of SLAM occurred at the 1986 IEEE Robotics and Automation Conference. Early work in this field showed that as a mobile robot moves through an unknown environment taking relative observations of landmarks, the estimates of these landmarks are necessarily correlated with one another because of common error in estimated vehicle locations, and that the correlations would grow following successive observations. Eventually, research uncovered that the combined mapping and localization problem was actually convergent. Some of the current proposed solutions are based on Kalman filtering and probabilistic localization and mapping. However, these solutions suffer from problems of accuracy and scaling to large regions.

Embodiments described herein provide an apparatus on a vehicle to generate a high-definition (HD) city-scale map, such as a grid map, and a method of generating the city-scale map. Generating such an HD city-scale map may entail integrating and stitching together different point clouds after determining a position and attitude (e.g., orientation) of each of the different point clouds. Using data from this city-scale map, a processor on the vehicle can detect or determine a presence of different objects or entities in the surrounding environment to assist the vehicle, or another vehicle, in performing navigation tasks such as vehicle acceleration and deceleration, vehicle braking, vehicle lane changing, adaptive cruise control, blind spot detection, rear-end radar for collision warning or collision avoidance, park assisting, cross-traffic monitoring, emergency braking, and automated distance control. Additionally, the generated city-scale map may supplement current high-definition (HD) and other maps to be used on the vehicle or on other vehicles.

Figure 1A:
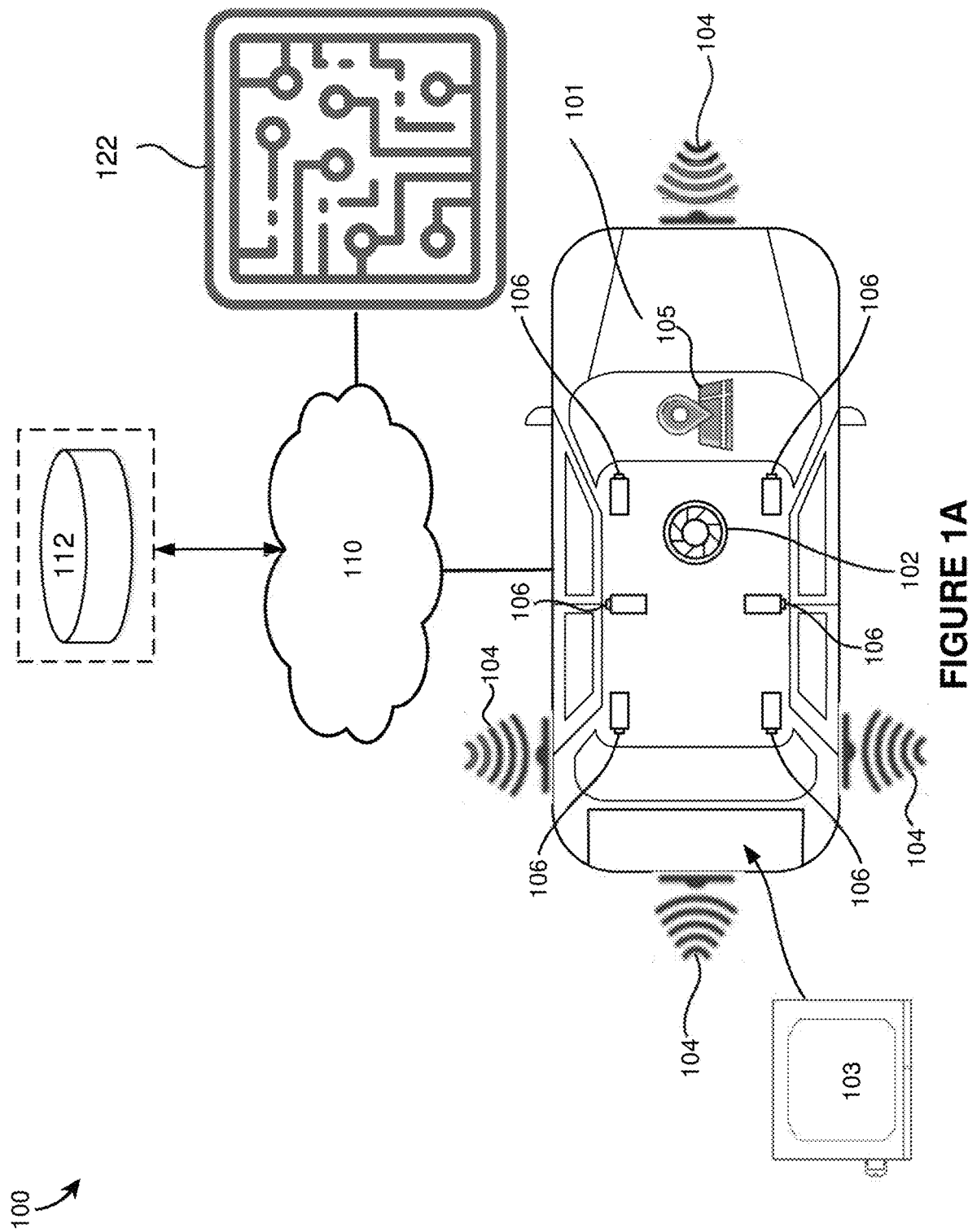
FIG. 1A illustrates an example environment of a system that acquires sensor data and maps an environment, according to an embodiment of the present disclosure.

FIG. 1A illustrates an example environment 100 of a system that generates a city-scale map, according to an embodiment of the present disclosure. In FIG. 1A, a vehicle 101 such as an autonomous vehicle may include sensors such as Lidar sensors 102, an inertial measurement unit (IMU) 103, radar sensors 104, a GPS or GNSS sensor (hereinafter "GPS sensor") 105, cameras 106, accelerometers, gyroscopes, magnetometers, and FIR (far infrared) sensors to detect and identify objects in a surrounding environment. In some embodiments, the IMU may include accelerometers and gyroscopes, and optionally, magnetometers. The sensor data may include pictorial or image data such as pictures or videos, audio data, audiovisual data, timestamp data, and/or other data indicating a position and/or pose of the vehicle 101 captured in either real-time or with a time delay. For example, data from the Lidar sensors 102, the IMU 103, the GPS sensor 105, and the timestamp data can be used to localize the vehicle 101 at different times while generating a city-scale map of the environment. The vehicle 101 can also include myriad actuators to propel and navigate the vehicle 101 in the surrounding based on the generated map. Such actuators may include, for example, any suitable electro-mechanical devices or systems such as actuators including drive-by-wire (DBW) actuators to control a throttle response, a braking action, a steering action, etc.

The environment 100 may also include one or more servers 112 accessible to a computing system 122. The one or more servers 112 may store frames of data from the sensors of the vehicle 101. In some embodiments, the one or more servers 112 may store integrated or fused data from the sensors. The one or more servers 112 may be accessible to the computing system 122 either directly or over the communication network 110. In some instances, the one or more servers 112 may include federated data stores, databases, or any other type of data source from which data may be stored and retrieved, for example. In some implementations, the one or more servers 112 may include point clouds which may be registered, or post-processed global navigation satellite system (GNSS)-inertial navigation system (INS) data. In general, a user operating a computing device can interact with the computing system 122 over the communication network 110, for example, through one or more graphical user interfaces and/or application programming interfaces. The computing system 122 may include one or more processors such as a graphics processing unit (GPU) or a central processing unit (CPU). The computing system 122 may include, for example, an integrated circuit containing a high-performance microprocessor or microcontroller such as a graphical processing unit (GPU) capable of executing algorithms that require processing large blocks of data (e.g., sensor data) in parallel, for example. In some example embodiments, the computing system 122 may include multiple types of processing units (e.g., GPUs, central processing units (CPUs), application-specific integrated circuits (ASICs), field-programmable gate arrays (FPGAs), etc.) potentially distributed across multiple computing devices and in communication with one another via one or more communication buses. The functions of the computing system 122 will be described further in the subsequent figures. Engines/program modules as described below can be implemented in any combination of hardware, software, and/or firmware. In certain example embodiments, one or more of these engines/program modules can be implemented, at least in part, as software and/or firmware modules that include computer-executable instructions that when executed by a processing circuit cause one or more operations to be performed. In example embodiments, these engines/program modules may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Figure 1B:
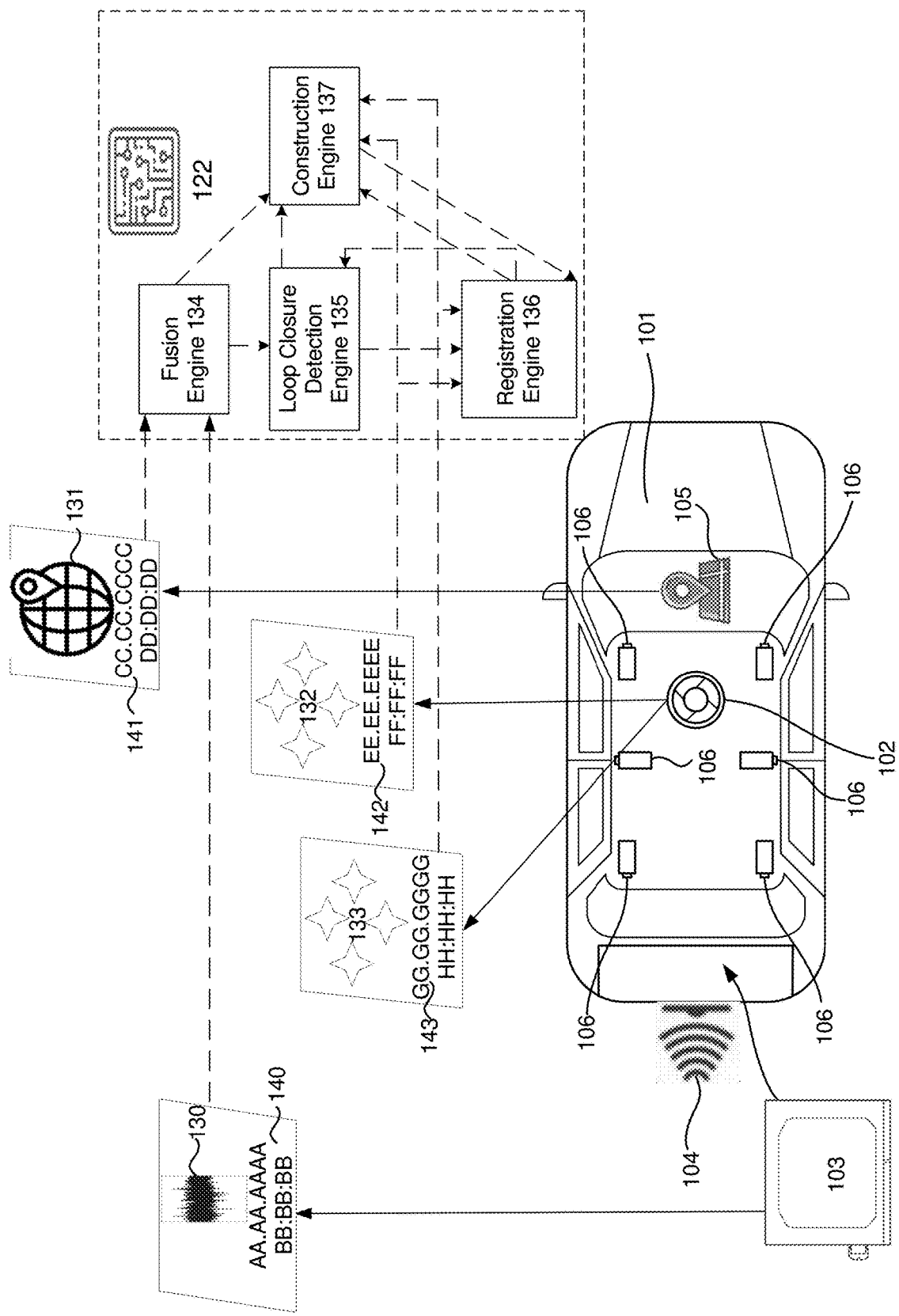
FIG. 1B illustrates a hybrid data flow and block diagram that depicts a system that acquires sensor data and maps an environment, in accordance with an example embodiment of the present disclosure.

FIG. 1B illustrates a hybrid data flow and block diagram that illustrates a process of localizing the vehicle 101 while generating a city-scale map, in accordance with an example embodiment. In FIG. 1B, the computing system 122 may one or more hardware processors, which may include, at least, a fusion engine 134, a loop closure detection engine 135, a registration engine 136, and a construction engine 137. In some embodiments, functions described with respect to the fusion engine 134, the loop closure detection engine 135, the registration engine 136, and the construction engine 137 may be performed by a single processor or any number of processors. For example, functions described with respect to the fusion engine 134, the loop closure detection engine 135, the registration engine 136, and the construction engine 137 may be may be combined or integrated into a single processor, and some or all functions performed by one or more of functions described with respect to the fusion engine 134, the loop closure detection engine 135, the registration engine 136, and the construction engine 137 may be may not be spatially separated, but instead may be performed by a common processor. To provide a brief summary, the fusion engine 134 may fuse or synchronize odometry data 130 and 131 from the IMU 103 and the GPS sensor 105, respectively. The output from the fusion engine 134 may be used, together with Lidar point clouds, by the construction engine 137, to generate a pose graph that includes nodes representing data of the vehicle 101 at distinct times, and associated with captured Lidar point clouds at the respective distinct times. The output from the fusion engine 134 may further be used to perform a preliminary estimation or inference of loop closures by the loop closure detection engine 135. For these loop closures that are inferred or estimated, the registration engine 136 may attempt to perform a point cloud registration on point clouds captured at times corresponding to the inferred or estimated loop closures. The output from the construction engine 137, including the nodes on the pose graph, may be used by the registration engine 136 to determine which point clouds to register, and from the registered point clouds, the loop closure detection engine 135 may infer or estimate additional loop closures, for example, from common features identified in overlapping registered point clouds. The construction engine 137 further incorporates constraints into each of the nodes and between the nodes that account for the fused odometry data from the fusion engine 134 and the inferred or confirmed, loop closures from the loop closure detection engine 135. For example, the constraints may require that the vehicle 101 be at or near a same location, within a threshold distance, at the times associated with the loop closures. As another example, the odometry constraints may require that the vehicle 101 be spaced apart at a given distance, within a threshold range of distances, between two distinct times. For example, an odometry constraint may require that the vehicle 101 be spaced apart by 500 meters at time 0 seconds and at time 5 seconds. The construction engine 137 may further augment map data from the registered point clouds from the registration engine 136 by stitching together partially overlapping point clouds.

In FIG. 1B, the IMU 103 may generate the odometry data 130, such as, a relative movement, velocity, and/or acceleration of the vehicle 101 at distinct times, each of the distinct times having a timestamp 140. Meanwhile, the GPS sensor 105 may generate odometry data 131 such as absolute location and velocity data of the vehicle 101 at distinct times, each of the distinct times having a timestamp 141. The Lidar sensor 102 may generate point clouds 132 and 133 containing Lidar data having respective timestamps 142 and 143. The point clouds 132 and 133 may include any of 2D, 3D, and/or 2D/3D fused Lidar data. Two point clouds are shown for illustration, but any number of point clouds may be generated. The timestamps 142 and 143 may indicate same or different times.

Figure 2A:
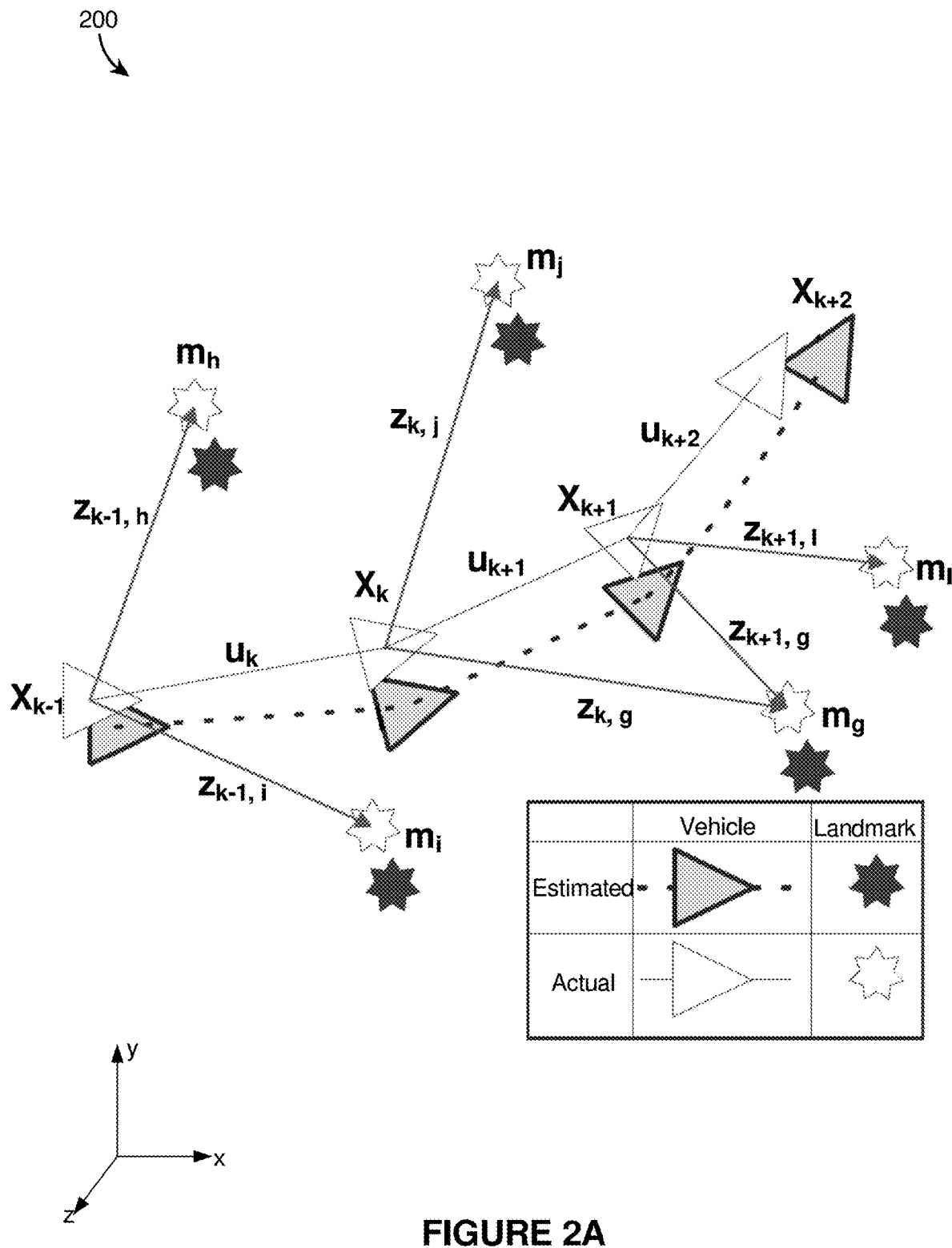
FIG. 2A illustrates an implementation of the computing system shown in accordance with FIGS. 1A-1B, in accordance with an example embodiment of the present disclosure. In particular.

The odometry data 130 and 131 generated from the IMU and GPS, respectively, having respective timestamps 140 and 141, may be fused or synchronized at the fusion engine 134, via GNSS/INS post processing. For example, IMU and GPS data captured at same times may be fused to obtain an estimate of a position and attitude (e.g., orientation) of the vehicle 101, as well as a covariance matrix indicating a confidence level or accuracy of each estimation. The estimated position and attitude may be superimposed, longitudinally and latitudinally, onto a map. In some embodiments, the fusion engine 134 may include Kalman filters and/or smoothing filters. In some embodiments, the point clouds 132 and/or 133 of the Lidar point cloud data may also be fused with the odometry data 130 and 131, at the fusion engine 134, to further provide a sanity check on the obtained position and attitude of the vehicle 101. Using the fused odometry data output from the fusion engine 134, together with the frames 142 and 143, the construction engine 137 may construct nodes on a pose graph, each of the nodes indicating data of the vehicle 101, such as, a position and attitude of the vehicle 101, at different times. As illustrated in FIG. 2A, a pose graph 200 may include nodes as represented by $X_{k-1}$; $X_k$; $X_{k+1}$; and $X_{k+2}$. Landmark locations may be represented by $m_h$; $m_i$; $m_j$; $m_g$; and $m_l$. The nodes $X_{k-1}$; $X_k$; $X_{k+1}$; and $X_{k+2}$, may indicate state vectors describing positions and attitudes of the vehicle 101 at times k−1, k, k+1, and k+2, respectively. The landmarks may be captured from Lidar point clouds such as the point clouds 132 and/or 133, and locations of the landmarks may be used to derive positions and attitudes of the Lidar point clouds. $u_k$; $u_{k+1}$; and $u_{k+2}$ may indicate controls and/or odometry readings of the vehicle 101 as the vehicle 101 travels between two nodes. $u_k$ is between the two nodes $X_{k-1}$ and $X_k$, $u_{k+1}$ is between the two nodes $X_k$ and $X_{k+1}$, and $u_{k+2}$ is between the two nodes $X_{k+1}$ and $X_{k+2}$. $z_{k-1}$; $z_{k-1, h}$; $z_{k-1, g}$; $z_k$, j; $z_{k+1, g}$; and $z_{k+1, l}$ represent observations taken of distinct times and landmarks. For instance, $z_{k-1, i}$ indicates an observation taken at a time k−1 of the landmark $m_i$. As the vehicle 101 travels along a trajectory, the construction engine 137 may construct additional nodes at distinct times and associates the additional nodes with captured sensor data such as Lidar point clouds. The nodes may be synchronized or correlated in time with captured Lidar point clouds, so that at each of the nodes, corresponding Lidar point clouds captured at a time corresponding to a time of the nodes are associated. Because a distance between a position of the vehicle 101 and an associated Lidar point cloud is known, a position and an attitude of the associated Lidar point cloud can be determined from the known position and the attitude of the vehicle 101. If multiple point clouds were captured at a same time, the registration engine 136 may perform a point cloud registration to combine these point clouds. The point cloud registration will be described in additional detail below with respect to FIGS. 3A and 3B, and may include a rotation and a translation to align one point cloud, a target point cloud, to another point cloud, a source point cloud. Meanwhile, additional constraints are introduced into the pose graph, the constraints defining restrictions of each of the nodes, between two nodes, and between nodes and landmarks, to continuously update estimations of positions and attitudes of the vehicle 101, so that initial estimations of positions and attitudes of the vehicle 101 and positions of the landmarks may be updated and eventually converge near actual positions and attitudes of the vehicle 101 and actual positions of the landmarks. The constraints increase a level of robustness of the pose graph.

Figure 2B:
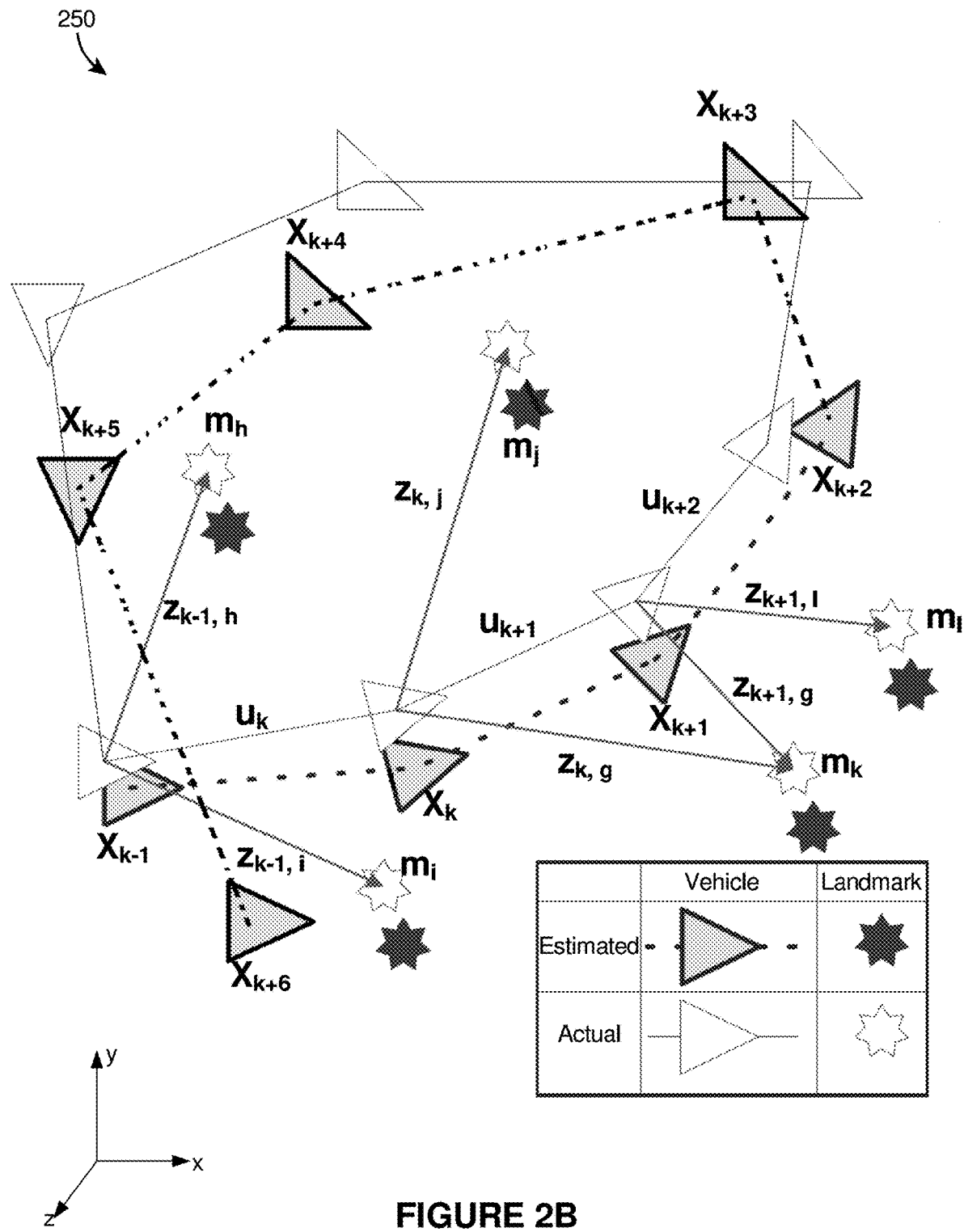
FIG. 2B illustrates an implementation of the computing system shown in accordance with FIGS. 1A-1B and 2A, in accordance with an example embodiment of the present disclosure. In particular.

Furthermore, the output from the fusion engine 134 may be used, by the loop closure detection engine 135, to perform an initial determination of potential loop closures based on proximities between positions at two different times, or proximities between different positions having time proximities. In other words, based on the fused odometry data generated from the fusion engine 134, the loop closure detection engine 135 may infer or estimate that the vehicle 101 is returning to a location within a threshold distance of a previously traversed, and having an attitude similar to that when the vehicle previously traversed the location. The location and attitude may be defined by x and y planar coordinates while disregarding z (elevational) coordinates. Thus, if the vehicle 101 is estimated to be returning to a same location as a location that the vehicle 101 previously accessed, but at an opposite orientation, the loop closure detection engine 135 may not detect a potential loop closure, because a loop closure condition may require that the vehicle returns to a previous location at a same or similar orientation as the previous orientation, such that the orientations do not differ by more than a threshold. An exemplary illustration of a loop closure is shown in a pose graph 250 illustrated in FIG. 2B, in which additional nodes $X_{k+3}$; $X_{k+4}$; $X_{k+5}$; and $X_{k+6}$ have been included. The loop closure detection engine 135 may infer or estimate that at the node $X_{k+6}$, corresponding to a time k+6, a position and an attitude of the vehicle 101 are within thresholds of the position and the attitude of the vehicle 101 at the node $X_{k-1}$ corresponding to the time k−1. The loop closure detection engine 135 may validate or confirm that the nodes $X_{k+6}$ and $X_{k-1}$ do indeed correspond to loop closures, for example, by determining whether common features exist at the point clouds captured at the nodes $X_{k+6}$ and $X_{k-1}$. One exemplary method involves converting and representing point clouds captured at the nodes $X_{k+6}$ and $X_{k-1}$ into a vector using, for example, a deconvolution network, encoding and decoding steps, and applying a model such as a bag-of-words model to recognize any common features. The detection of loop closures increases an accuracy of the pose graph by reducing a drift error that would otherwise occur over time, and incorporating an additional constraint corresponding to the loop closure. Thus, an estimated position and the attitude represented by the node $X_{k+6}$ may be updated, along with positions and attitudes represented by previous nodes. An estimated position and attitude of the point clouds associated with each of the nodes may also be updated.

Figure 3A:
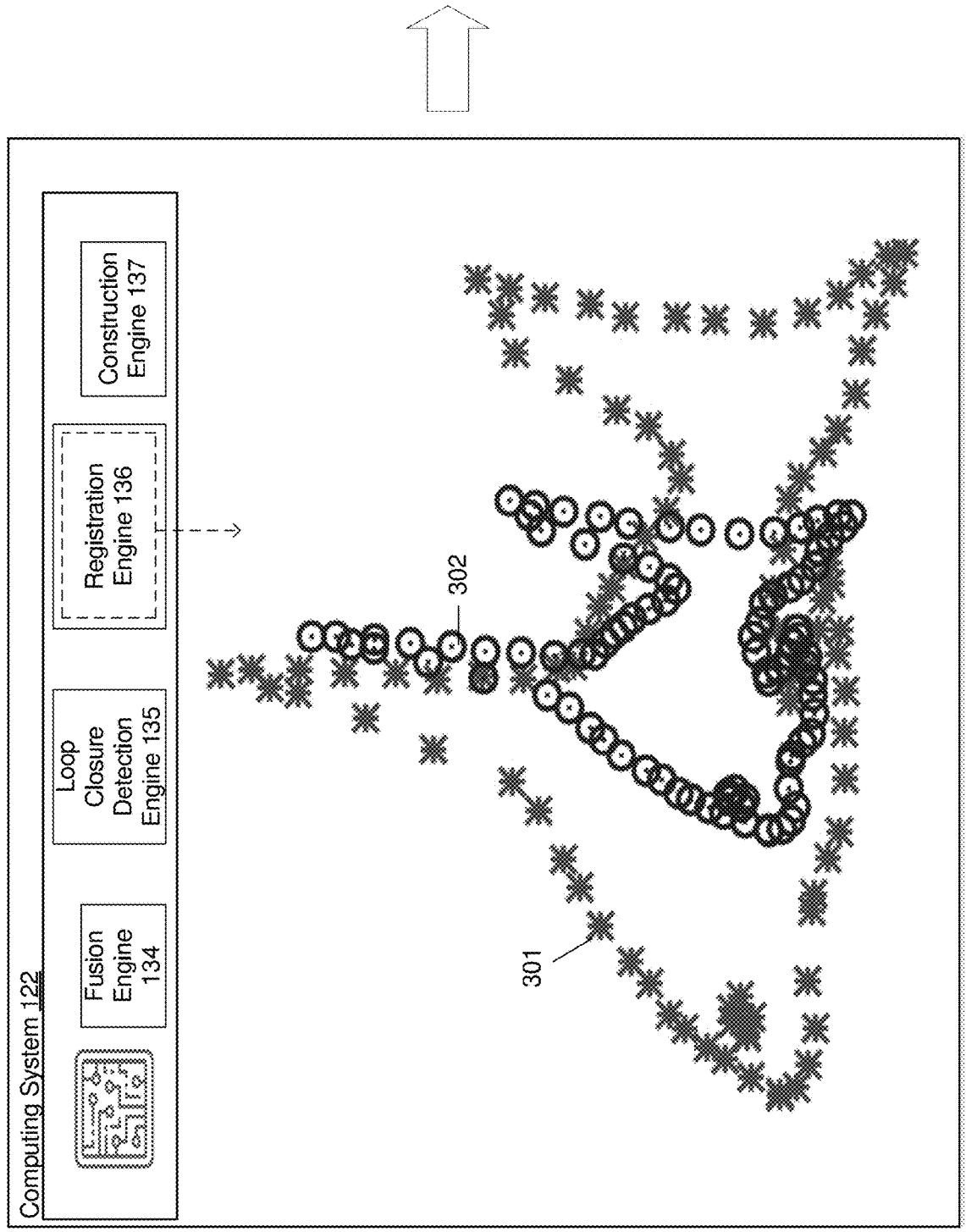
FIGS. 3A-3B and 4A-4B illustrate an exemplary implementation of a point cloud registration process, in accordance with an example embodiment of the present disclosure.
Figure 3B:
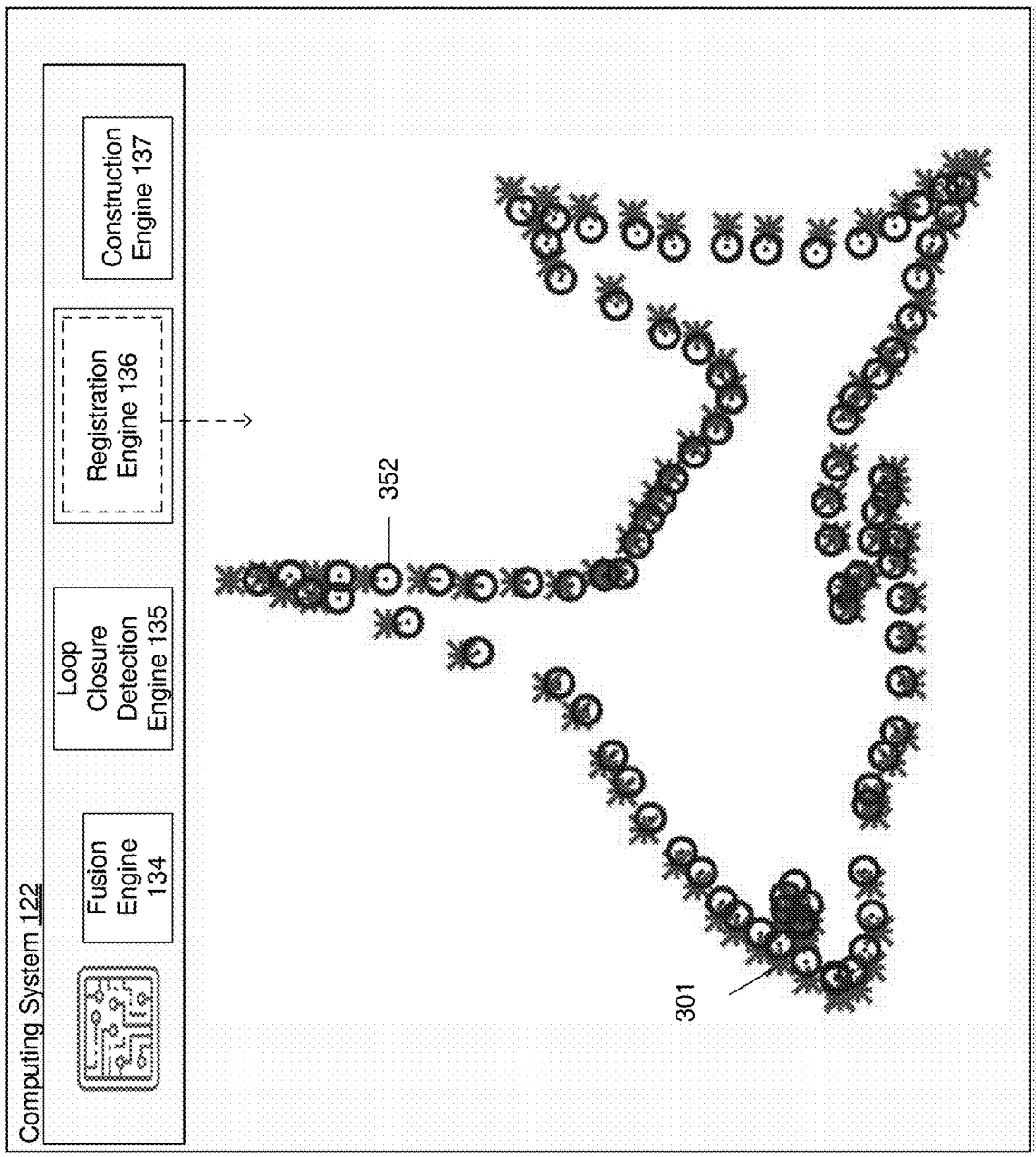

Upon the loop closure detection engine 135 inferring or estimating a potential loop closure, the registration engine 136 may attempt to perform a point cloud registration on the point clouds captured at a same time (e.g., the point clouds captured at the times k+6 and k−1 in FIG. 2B) corresponding to the potential loop closure. The registration engine 136 may also attempt to perform point cloud registration on point clouds having time proximities, meaning that the point clouds were captured at similar times within a threshold duration of each other. If, following the attempted point cloud registration, the resulting registered point clouds do not sufficiently align, then the individual point clouds may be kept separate without registration. An illustration of the point cloud registration process is shown in FIGS. 3A and 3B, in which point clouds 301 and 302 that are initially unaligned and have different origins are registered by a rigid transformation of the point cloud 302. The rigid transformation may include a translation and rotation of the point cloud 302 to align with the point cloud 301 as closely as possible. Here, the point cloud 301 may be a source, or an earlier point cloud, and the point cloud 302 may be a target, or a later point cloud that is transformed to be aligned with the point cloud 301. Following a transformation of the point cloud 302, a transformed point cloud 352 may be aligned with the point cloud 301. Outliers and background data from one or both of the point clouds 301 and 302 may be detected and filtered following an initial transformation, and following removal of outliers and background data, the registration process may be repeated.

Figure 4A:
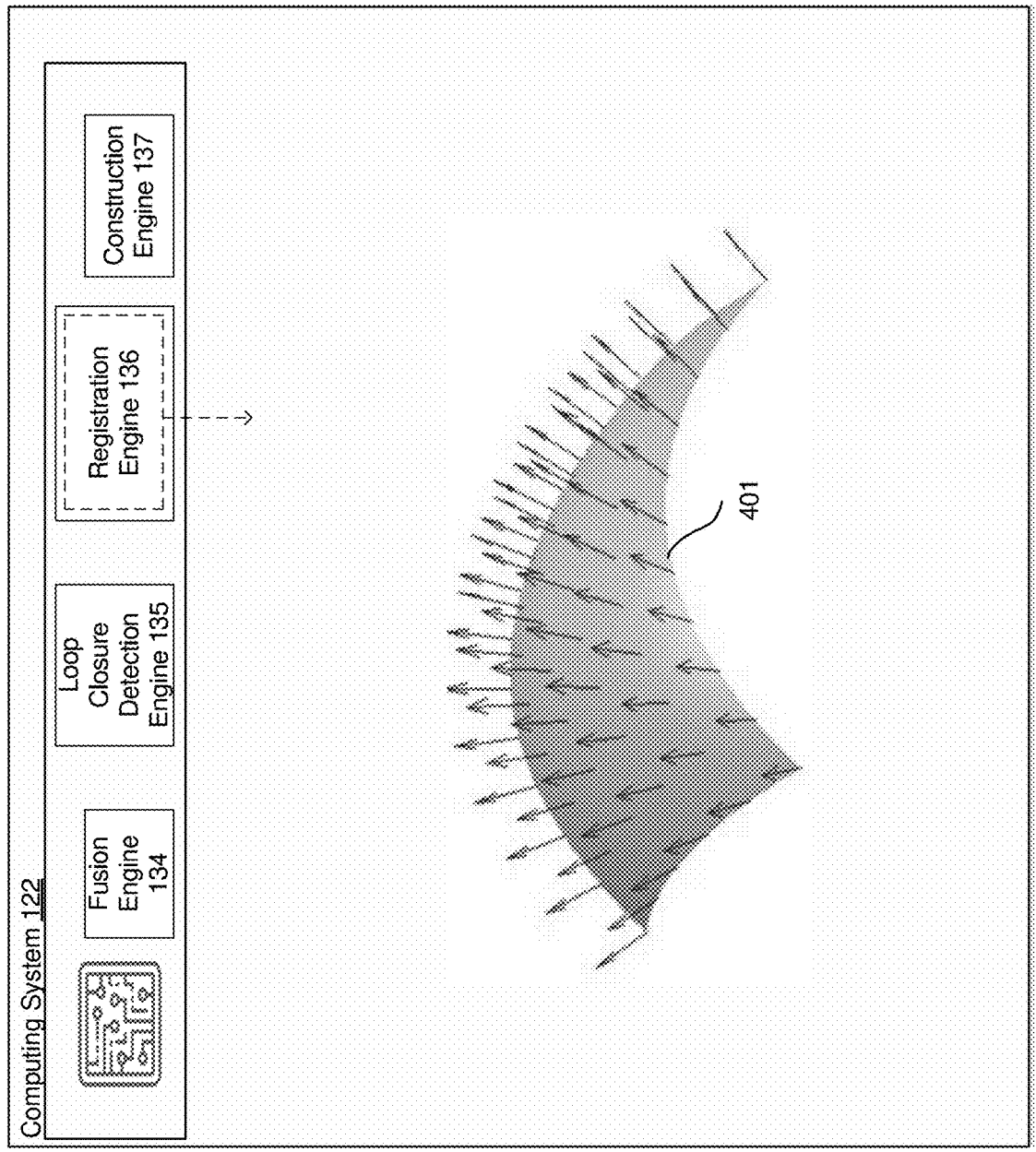
Figure 4B:
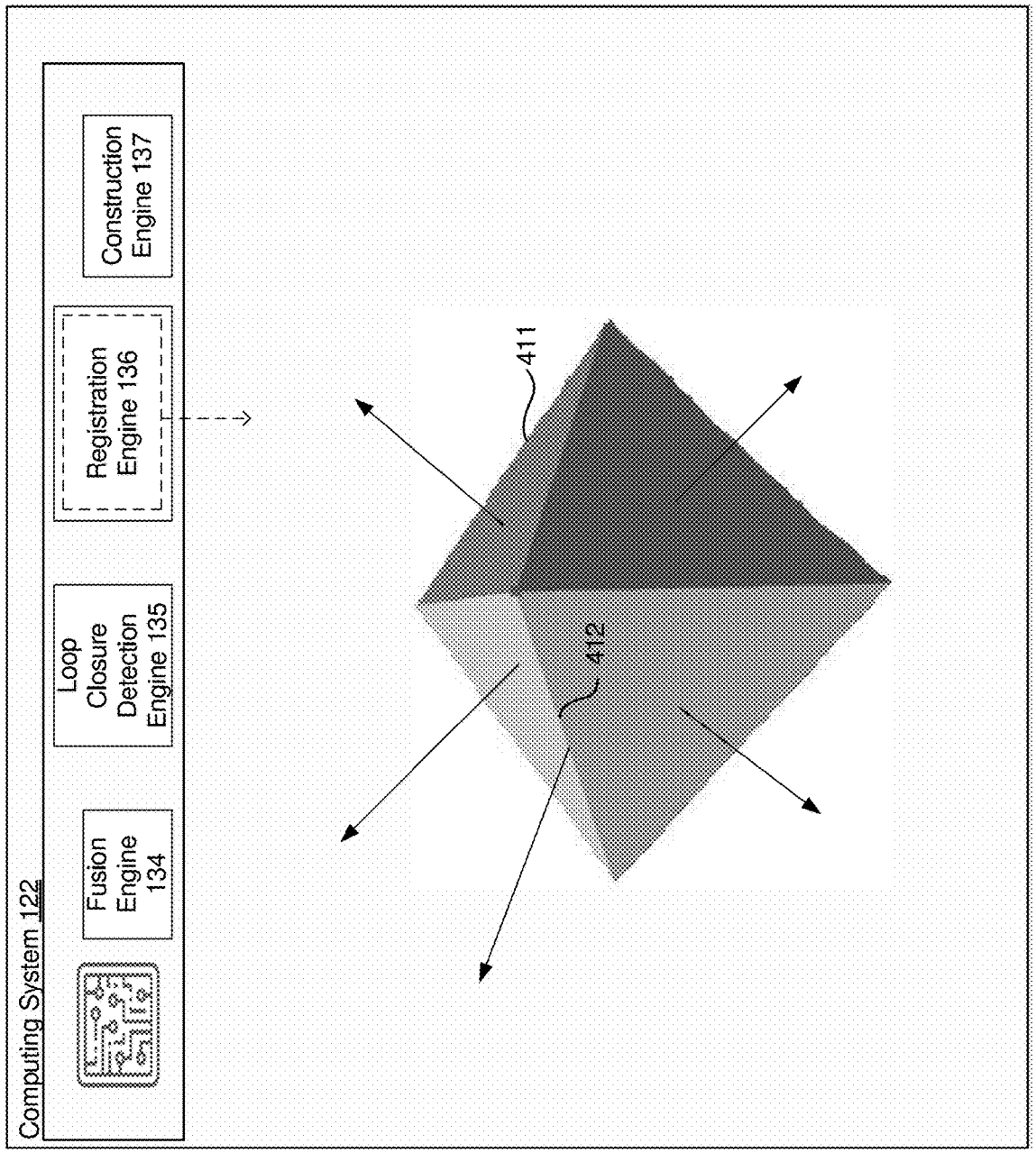

The point cloud registration process, as carried out, for example, by the registration engine 136, may maintain speed and simplicity to conserve processing resources while also accounting for outliers, measurement noise, and other probabilistic techniques to enhance robustness. The process may include estimating a surface normal of each point in a point cloud, as shown in FIGS. 4A and 4B. Here, a normal to each point of Lidar data is considered, and a distribution of each point relative to its neighbors is considered. Here, for each point of Lidar data, a normal to an estimated surface that the point belongs to may be obtained. The surface may be a curved surface, such as 401, as shown in FIG. 4A, or one or flat surfaces 411, as shown in FIG. 4B. In some embodiments, a point may lie on an edge or a corner, such as an edge 412. In such a scenario, the surface normal may be determined to be a same as a surface normal of a nearest neighboring point, or, an average, such as a weighted average, between surface normals of two nearest neighboring points. Estimating a surface normal of each point may improve a rate of convergence to a solution. Preliminary steps of the point cloud registration process further include determining or estimating a range accuracy of each point based on a distance from the point to a Lidar sensor (e.g., the Lidar sensor 102), a relative difference between the surface normal and an orientation of the Lidar, a previous estimation of the surface, and an intensity of the surface. A category of the entire point cloud may be determined based on a degree to which the point cloud is self-repetitive, which may indicate a frequency or degree to which features in the point cloud repeat. In some embodiments, the categories may include, a flat surface, a pole, or not falling under any specific feature (e.g., uncategorized). The categories may include, ground, road surface, high vegetation, a building, and a human made object. As another example, categories may include bare earth, ground, top of canopy, and water. The categories may define a type of object or entity that has reflected a laser pulse from the Lidar sensor. If the point cloud has a high degree of self-repetitiveness such as, in tunnels, where the obtained point clouds are similar regardless of a location of point cloud capture, parameters that regulate the determination of a potential loop closure candidate may be tightened, compared to corresponding parameters in regions of lower self-repetitiveness, to reduce a possibility of mistaken determinations of loop closures. Certain potentially detected loop closures may be discarded. Next, a category of each point in the point cloud may be classified, based on a surface normal and an associated singular value of the surface normal. In particular, for each point in the point cloud, geometric neighbors of the point are obtained. A covariance matrix may be determined based on these neighbor points and the point. An eigen decomposition (EVD) of the point may be determined. This process is known as principal component analysis (PCA). The eigen decomposition will yield eigenvalues, which is synonymous with the singular value obtained from singular value decomposition (SVD) because of the symmetric nature of the covariance matrix. However, performing an EVD may be less computationally expensive. Based on features of the eigenvalues, for example, relative values of the eigenvalues, the point may be classified as a flat surface, a pole, or not belonging to a specific category.

The point cloud registration process includes an iterative process that is repeated until convergence. For each point from a source point cloud, obtained at an earlier time, a corresponding closest point in a target point cloud, obtained at a later time, may be selected using a GPU. The point from the source point cloud and the closest point are required to have a same category, or else, that pair is discarded and another point from the source point cloud and a closest point in the target point cloud are selected. For a point from the source point cloud and a corresponding closest point in the target point cloud having matching categories, a mahalanobis distance may be determined between the two points based on the surface normal of the source point cloud. Cost functions may be determined based on the determined mahalanobis distance and based on the determined or estimated range accuracy of the point from the source point cloud and/or the target point cloud. A solution to minimize the cost functions may be obtained by adjusting position and attitude parameters of the source point cloud relative to an origin. In some examples, the origin may be a rear-axis of the vehicle, and an attitude is defined to be a same as an attitude of the vehicle. The origin and the axes, however, can be defined in other manners, such as an origin of the Lidar sensor, or an origin of a navigation-box of the vehicle. Defining different origins will yield different coordinates of the source point cloud. The iterative process converges when an amount of adjustment or change in the position and the attitude parameters between successive iterations differs by less than a threshold.

Based on the registered point clouds, the loop closure detection engine 135 may additionally detect and/or infer potential loop closures. For example, if two point clouds from different times have been successfully registered by the registration engine 136, the loop closure detection engine 135 may infer that a potential loop closure has occurred corresponding to these two different times because similar or same features were observed from the two point clouds. The loop closure detection engine 135 may then validate or confirm that a loop closure has occurred. If the loop closure has been confirmed or validated, the construction engine 137 may then add a loop closure constraint between two nodes corresponding to the different times. For example, the loop closure constraint may require that the vehicle 101 be at or near a same location, within a threshold distance, at the times associated with the loop closures. The construction engine 137 may further add odometry constraints based on the GNSS/INS post processing data obtained from the fusion engine 134.

For each of the loop closure, odometry, and other constraints, a corresponding cost function may be determined. Parameters associated with a position and an attitude of associated point clouds such that the cost function is optimized and convergent may be determined. When a cost function is optimized, the corresponding constraint may be satisfied. Next, further refinement to the parameters may be carried out. For example, if a constraint cannot be satisfied or minimized, such a constraint may be removed based on a self-adaption threshold of an actual cost, iterations of repetition, and differences in Euclidean distance. Furthermore, loop closure constraints may be added in regions of which a degree of self-repetition (a frequency or number of repeated features) is greater than a threshold, while avoiding points that have been previously removed. In particular, a previous process of tightening the parameters in self-repetitive regions may cause points to become detached from the pose graph and misalignment among points. For those detached or misaligned points, the registration engine 136 may attempt to add constraints. The constraints may be from loop closure or from other sources such as GNSS-IMU post processing. The parameters may be further refined based on the newly removed and added constraints. Constraints may continue to be removed until a number of constraints that cannot be minimized is smaller than a threshold, at which point the process is considered to converge.

Figure 5:
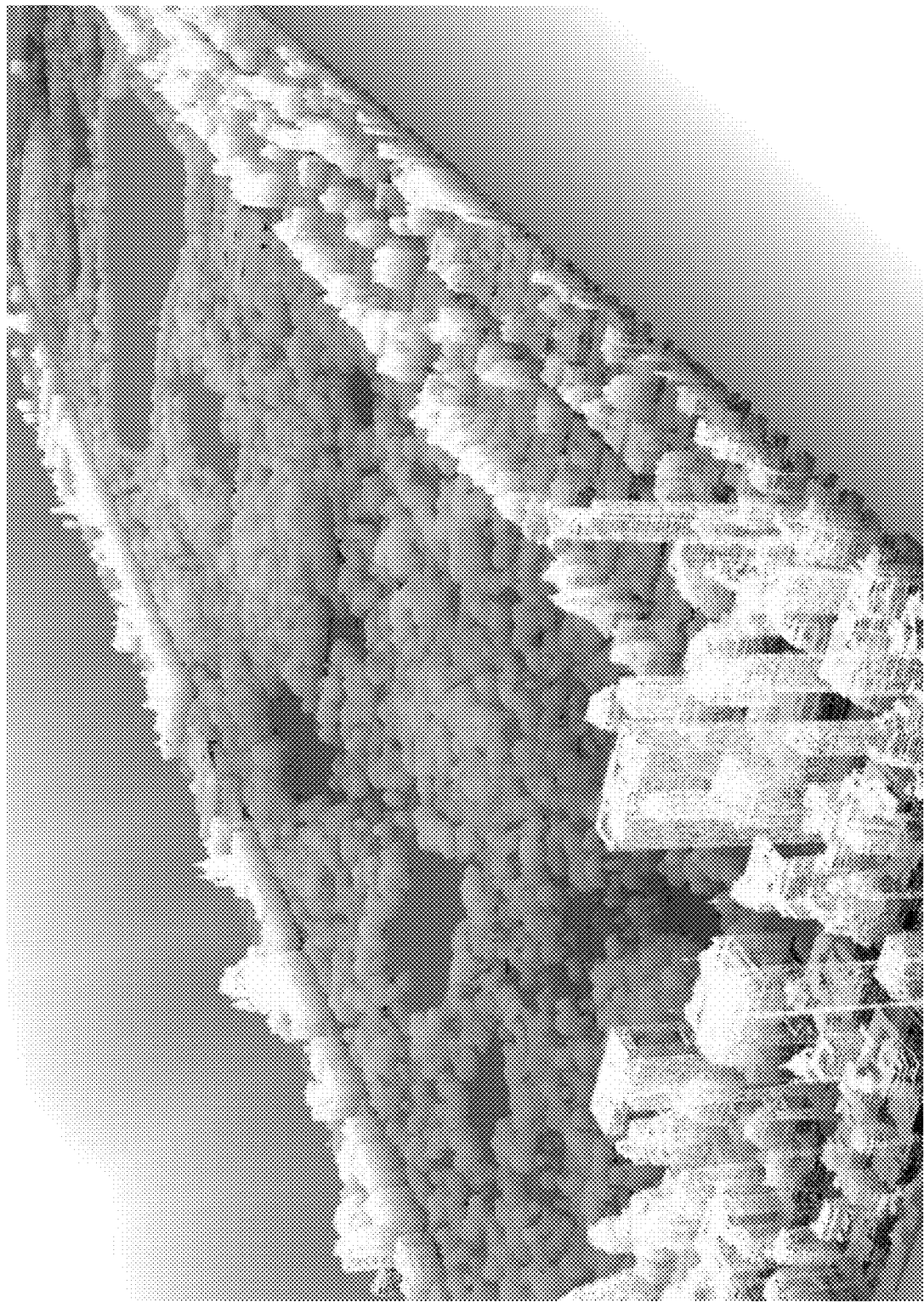
FIG. 5 illustrates an exemplary implementation, in accordance with an example embodiment of the present disclosure.

Once position and attitude information is determined for each of the point clouds, the point clouds may be properly aligned with one another, and stitched together to obtain a map on a city-scale. FIG. 5 illustrates an exemplary map that could be obtained using the process described above.

Figure 6:
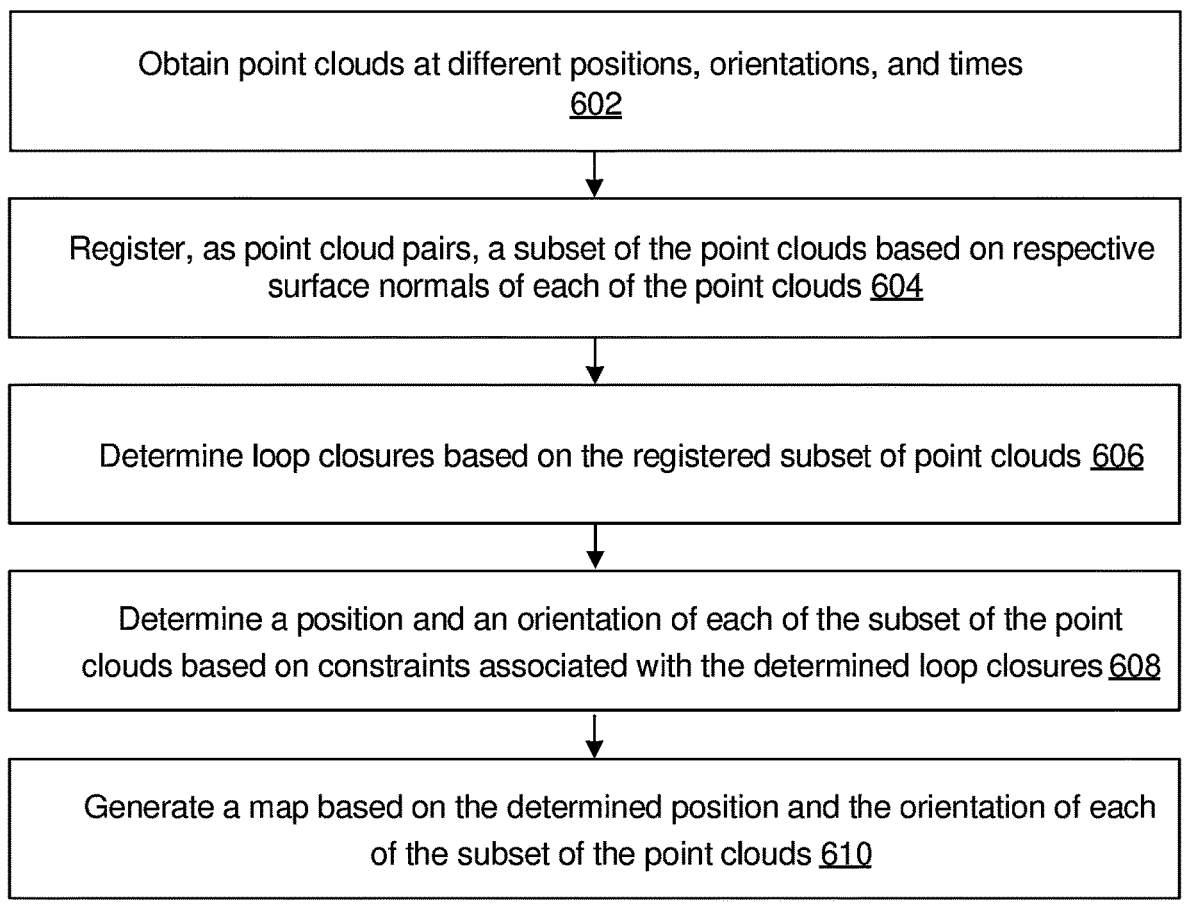
FIG. 6 illustrates a flowchart of a mapping method, in accordance with an example embodiment of the present disclosure.

FIG. 6 illustrates a flowchart of a mapping method, according to an example embodiment of the present disclosure. The description from other figures may also be applicable to FIG. 6. In step 602, one or more sensors such as one or more Lidar sensors may obtain point clouds at different positions, orientations, and times. In step 604, one or more processors may register, as pairs, a subset of the point clouds based on respective surface normals of each of the point clouds. The registration process may align a pair of point clouds. In step 606, one or more processors may determine loop closures based on the registered subset of point clouds. In step 608, one or more processors may determine a position and an orientation of each of the subset of the point clouds based on constraints associated with the determined loop closures. In step 610, one or more processors may generate a map based on the determined position and the orientation of each of the subset of the point clouds.

The techniques described herein, for example, are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination.

Figure 7:
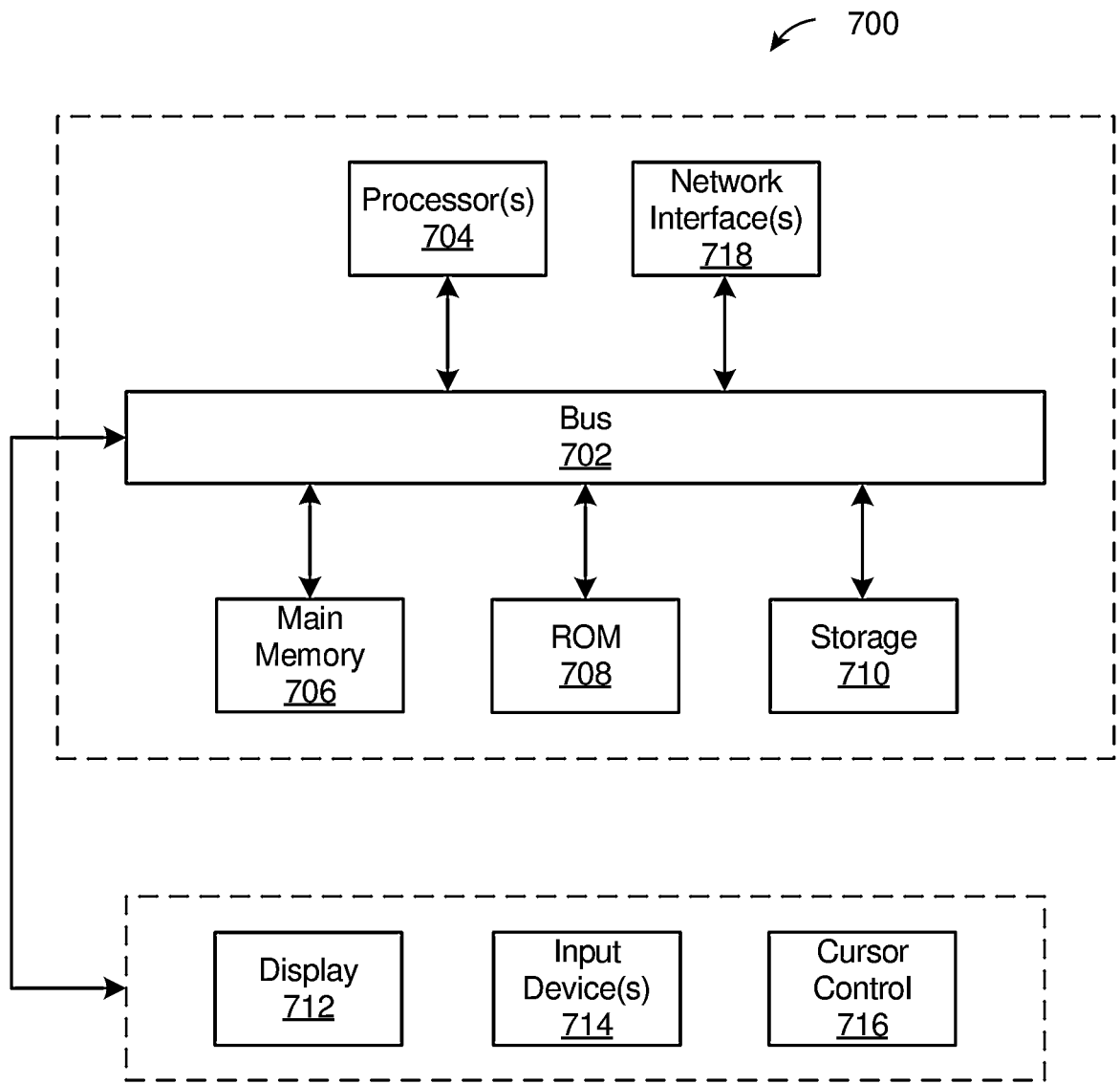
FIG. 7 illustrates a block diagram of a computer system upon which any of the embodiments described herein may be implemented.

FIG. 7 illustrates a block diagram of a computer system 700 upon which any of the embodiments described herein may be implemented. The computer system 700 includes a bus 702 or other communication mechanism for communicating information, one or more hardware processors 704 coupled with bus 702 for processing information. A description that a device performs a task is intended to mean that one or more of the hardware processor(s) 704 performs that task. The hardware processor(s) 704 may be hard-wired to perform techniques described in the Specification; they may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The hardware processor (s) 704 may also combine custom hard-wired logic, ASICs, or FPGAs with custom programming to accomplish the techniques. The hardware processor(s) 704 can include any suitable processing unit capable of accepting data as input, processing the input data in accordance with stored computer-executable instructions, and generating output data. The hardware processor(s) 704 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the hardware processor(s) 704 can have any suitable microarchitecture design that includes any number of constituent components such as, for example, registers, multiplexers, arithmetic logic units, cache controllers for controlling read/write operations to cache memory, branch predictors, or the like. The microarchitecture design of the hardware processor(s) 704 can be made capable of supporting any of a variety of instruction sets.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to output device(s) 712, such as a cathode ray tube (CRT) or LCD display (or touch screen), for displaying information to a computer user. Input device(s) 714, including alphanumeric and other keys, are coupled to bus 702 for communicating information and command selections to processor 704. Another type of user input device is cursor control 716. The computer system 700 also includes a communication interface 718 coupled to bus 702.

The term "engine" or "program module" should be understood to encompass a tangible entity, be that an entity that is physically constructed, permanently configured (e.g., hard-wired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiment.

A component being implemented as another component may be construed as the component being operated in a same or similar manner as the another component, and/or comprising same or similar features, characteristics, and parameters as the another component.

The invention claimed is:

1. A computing system on a vehicle configured to generate a city-scale map, the computing system configured to generate a city-scale map and comprising:
    one or more processors; and
    a memory storing instructions that, when executed by the one or more processors, cause the system to perform:
        obtaining point clouds at different positions, orientations, or times;
        registering, in pairs, a subset of the point clouds based on respective surface normals of each of the point clouds;
        obtaining odometry data, the odometry data comprising inertial measurement unit (IMU) data from an IMU and global navigation satellite system (GNSS) data from a GNSS sensor;
        determining a position or an orientation of each of the subset of the point clouds based on a constraint associated with the odometry data; and
        generating a map based on the determined position or the orientation of each of the subset of the point clouds.

2. The computing system of claim 1, wherein the instructions further cause the computing system to perform:
    constructing a cost function corresponding to a constraint associated with one or more determined loop closures and the constraint associated with the odometry data; and
    the determining a position or an orientation of each of the subset of the point clouds is based on an optimization of the cost function corresponding to the constraint associated with the one or more determined loop closures and the constraint associated with the odometry data.

3. The computing system of claim 1, wherein the determining a position or an orientation of each of the subset of the point clouds is based on a distance between the vehicle and each of the subset of the point clouds.

4. The computing system of claim 1, the registering comprising:
    aligning a target point cloud with a source point cloud based on a position parameter or an orientation parameter of the source point cloud and the target point cloud, wherein the target point cloud was obtained at a later time compared to the source point cloud; and
    determining a rigid transformation including a rotation and a translation to form an alignment, based on the position parameter or the orientation parameter, between the target point cloud and the source point cloud.

5. The computing system of claim 4, wherein the registering further comprises:
    determining the position parameter or the orientation parameter based on a point from the source point cloud and a corresponding closest point in the target point cloud.

6. The computing system of claim 5, wherein the point and the corresponding closest point have a common category indicative of respective degrees to which the source point cloud and the target point cloud are self-repetitive.

7. The computing system of claim 5, wherein the registering further comprises:
    determining that the point and the corresponding closest point have a common category based on an eigen decomposition of the point and the corresponding closest point.

8. The computing system of claim 1, wherein the determining a position or an orientation of each of the subset of the point clouds is based on a distance between the vehicle and each of the subset of the point clouds.

9. The computing system of claim 1, wherein the instructions further cause the computing system to perform:
    determining loop closures based on the registered subset of point clouds; and the determination of the position or an orientation of each of the subset of the point clouds is additionally based on a constraint associated with the determined loop closures.

10. The computing system of claim 9, wherein the instructions further cause the computing system to perform:
    determining whether the constraint associated with the determined loop closures and the constraint associated with the fused GNSS and IMU data is satisfiable; and
    in response to determining that the constraint associated with the determined loop closures or the constraint associated with the fused GNSS and IMU data is unsatisfiable, removing the constraint determined to be unsatisfiable based on a self-adaption threshold of an actual cost, iterations of repetition, or differences in Euclidean distance.

11. A computer-implemented method performed by one or more processors on a vehicle, comprising:
    obtaining point clouds at different positions, orientations, or times;
    registering, in pairs, a subset of the point clouds based on respective surface normals of each of the point clouds;

obtaining odometry data, the odometry data comprising inertial measurement unit (IMU) data from an IMU and global navigation satellite system (GNSS) data from a GNSS sensor;

determining a position or an orientation of each of the subset of the point clouds based on a constraint associated with the odometry data; and generating a map based on the determined position or the orientation of each of the subset of the point clouds.

12. The computer-implemented method of claim 11, further comprising:

constructing a cost function corresponding to a constraint associated with one or more determined loop closures and the constraint associated with the odometry data; and the determining a position or an orientation of each of the subset of the point clouds is based on an optimization of the cost function corresponding to the constraint associated with the one or more determined loop closures and the constraint associated with the odometry data.

13. The computer-implemented method of claim 11, wherein the determining a position or an orientation of each of the subset of the point clouds is based on a distance between the vehicle and each of the subset of the point clouds.

14. The computer-implemented method of claim 11, the registering comprising:

aligning a target point cloud with a source point cloud based on a position parameter or an orientation parameter of the source point cloud and the target point cloud, wherein the target point cloud was obtained at a later time compared to the source point cloud; and determining a rigid transformation including a rotation and a translation to form an alignment, based on the position parameter or the orientation parameter, between the target point cloud and the source point cloud.

15. The computer-implemented method of claim 14, wherein the registering further comprises:

determining the position parameter or the orientation parameter based on a point from the source point cloud and a corresponding closest point in the target point cloud.

16. The computer-implemented method of claim 15, wherein the point and the corresponding closest point have a common category indicative of respective degrees to which the source point cloud and the target point cloud are self-repetitive.

17. The computer-implemented method of claim 15, wherein the registering further comprises:

determining that the point and the corresponding closest point have a common category based on an eigen decomposition of the point and the corresponding closest point.

18. The computer-implemented method of claim 11, wherein the determining a position or an orientation of each of the subset of the point clouds is based on a distance between the vehicle and each of the subset of the point clouds.

19. The computer-implemented method of claim 11, further comprising:

determining loop closures based on the registered subset of point clouds; and the determination of the position or an orientation of each of the subset of the point clouds is additionally based on a constraint associated with the determined loop closures.

20. The computer-implemented method of claim 19, further comprising:

determining whether the constraint associated with the determined loop closures and the constraint associated with the fused GNSS and IMU data is satisfiable; and in response to determining that the constraint associated with the determined loop closures or the constraint associated with the fused GNSS and IMU data is unsatisfiable, removing the constraint determined to be unsatisfiable based on a self-adaption threshold of an actual cost, iterations of repetition, or differences in Euclidean distance.

\* \* \* \* \*